US011412450B2

(12) United States Patent
Chang et al.

(10) Patent No.: US 11,412,450 B2
(45) Date of Patent: Aug. 9, 2022

(54) PAGING AND ESSENTIAL SYSTEM INFORMATION BLOCK (SIB) TRANSMISSION IN THE UNLICENSED INTERNET OF THINGS (U-IOT) SYSTEM

(71) Applicant: Apple Inc., Cupertino, CA (US)

(72) Inventors: Wenting Chang, Beijing (CN); Huaning Niu, San Jose, CA (US); Anthony Lee, San Diego, CA (US); Salvatore Talarico, Sunnyvale, CA (US); Qiaoyang Ye, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/478,246

(22) PCT Filed: Jun. 13, 2018

(86) PCT No.: PCT/US2018/037235
§ 371 (c)(1),
(2) Date: Jul. 16, 2019

(87) PCT Pub. No.: WO2018/231918
PCT Pub. Date: Dec. 20, 2018

(65) Prior Publication Data
US 2020/0169955 A1    May 28, 2020

Related U.S. Application Data

(60) Provisional application No. 62/561,111, filed on Sep. 20, 2017.

(30) Foreign Application Priority Data

Jun. 13, 2017   (WO) ................ PCT/CN2017/088039

(51) Int. Cl.
*H04W 52/02* (2009.01)
*H04L 5/00* (2006.01)
*H04W 4/70* (2018.01)
*H04W 72/00* (2009.01)
(Continued)

(52) U.S. Cl.
CPC ......... *H04W 52/0229* (2013.01); *H04L 5/001* (2013.01); *H04L 5/0012* (2013.01);
(Continued)

(58) Field of Classification Search
CPC . H04W 52/0229; H04W 4/70; H04W 72/005; H04W 72/042; H04W 68/005;
(Continued)

(56) References Cited

U.S. PATENT DOCUMENTS 10,411,940 B2 *   9/2019  Ko ..................... H04W 72/0453
10,728,811 B2 *   7/2020  Kim ........................ H04W 4/70
(Continued)

FOREIGN PATENT DOCUMENTS

WO         2016/159696         10/2016

OTHER PUBLICATIONS

International Search Report dated Nov. 26, 2018 for International Application No. PCT/US2018/037235.
(Continued)

*Primary Examiner* — Nishant Divecha
(74) *Attorney, Agent, or Firm* — Eschweiler & Potashnik, LLC

(57) ABSTRACT

Machines or networked devices such as internet of things (IoT) devices operate to generate an unlicensed IoT (U-IoT) communication or enhanced Machine Type Communication (eMTC) based on frequency hopping operations on different channels. An anchor channel can be configured to carry system information and paging messages for the U-IoT/eMTC communication on the different channels. The system information and paging messages can include essential system information such as a system information block MulteFire (SIB-MF) message. Physical channels can be configured to enable component carriers anchored to a long term evolution (LTE) licensed band, and entirely comprise
(Continued)

unlicensed carrier components that are unanchored to any LTE component carrier in a standalone configuration to enable transmission of the U-IoT communication in standalone communications in an unlicensed band.

21 Claims, 12 Drawing Sheets

(51) Int. Cl.
H04W 72/04 (2009.01)
H04W 68/00 (2009.01)
(52) U.S. Cl.
CPC ........... *H04W 4/70* (2018.02); *H04W 68/005* (2013.01); *H04W 72/005* (2013.01); *H04W 72/042* (2013.01)
(58) Field of Classification Search
CPC ...... H04W 16/14; H04L 5/0012; H04L 5/001; Y02D 30/70
See application file for complete search history.

(56) References Cited

U.S. PATENT DOCUMENTS

| | | | |
|---|---|---|---|
| 2009/0296643 A1* | 12/2009 | Cave | H04L 1/1835 370/329 |
| 2012/0127946 A1* | 5/2012 | Nishio | H04L 1/0038 370/329 |
| 2013/0010619 A1* | 1/2013 | Fong | H04W 72/0453 370/252 |
| 2015/0222410 A1 | 8/2015 | Belghoul et al. | |
| 2018/0020432 A1* | 1/2018 | Rico Alvarino | H04W 72/048 |
| 2018/0035411 A1* | 2/2018 | Wang | H04L 1/0045 |
| 2018/0124644 A1* | 5/2018 | Rico Alvarino | H04W 52/0209 |
| 2018/0192383 A1* | 7/2018 | Nam | H04J 11/0073 |
| 2018/0213382 A1* | 7/2018 | Tabet | H04L 67/04 |
| 2018/0287845 A1* | 10/2018 | Kim | H04L 5/0053 |
| 2018/0309479 A1* | 10/2018 | Yerramalli | H04L 5/0012 |
| 2018/0359656 A1* | 12/2018 | Liu | H04W 72/042 |
| 2019/0029005 A1* | 1/2019 | Bendlin | H04L 5/0053 |
| 2019/0149383 A1* | 5/2019 | Ko | H04W 72/04 370/329 |
| 2019/0159179 A1* | 5/2019 | Liu | H04L 5/001 |
| 2019/0174510 A1* | 6/2019 | Shin | H04W 72/042 |
| 2019/0372734 A1* | 12/2019 | Choi | H04L 5/0048 |
| 2020/0187170 A1* | 6/2020 | Shin | H04W 28/06 |

OTHER PUBLICATIONS

International Preliminary Report on Patentability dated Dec. 26, 2019 for International Application No. PCT/US2018/037235.

* cited by examiner

PAGING AND ESSENTIAL SYSTEM INFORMATION BLOCK (SIB) TRANSMISSION IN THE UNLICENSED INTERNET OF THINGS (U-IOT) SYSTEM

REFERENCE TO RELATED APPLICATIONS

This application is a National Phase entry application of International Patent Application No. PCT/US2018/037235 filed Jun. 13, 2018, which claims priority to International Patent Application Number PCT/CN2017/088039 filed Jun. 13, 2017, entitled "PAGING AND ESSENTIAL SYSTEM INFORMATION BLOCK (SIB) TRANSMISSION IN THE UNLICENSED INTERNET OF THINGS (U-IOT) SYSTEM", and the benefit of U.S. Provisional Application No. 62/561,111 filed Sep. 20, 2017, entitled "PAGING AND ESSENTIAL SYSTEM INFORMATION BLOCK (SIB) TRANSMISSION IN THE UNLICENSED INTERNET OF THINGS (U-IOT) SYSTEM", and is hereby incorporated by reference in its entirety.

FIELD

The present disclosure relates to wireless technology, and more specifically to paging and essential information block (SIB) transmission in unlicensed internet of things (U-IoT) systems.

BACKGROUND

Wireless mobile communication technology uses various standards and protocols to transmit data between a node (e.g., a transmission station) and a wireless device (e.g., a mobile device), or a user equipment (UE). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the access node can be an Evolved Universal Terrestrial Radio Access Network (E-UTRAN) Node Bs (also commonly denoted as evolved Node Bs, enhanced Node Bs, eNodeBs, or eNBs) with or without one or more Radio Network Controllers (RNCs), which can communicate with the UE. The DL transmission can be a communication from an access point/node or base station (e.g., a macro cell device, an eNodeB, an eNB, WiFi node, or other similar network device) to the UE, and the UL transmission can be a communication from the wireless network device to the node.

Additionally, the Internet of Things (IoT) is beginning to grow significantly, as consumers, businesses, and governments recognize the benefit of connecting devices to the internet. A significant segment of this industry is intended to operate over vast areas under the initiative low-power wide-area networking (LP-WAN), which is supposed to provide a global solution for both licensed and unlicensed spectrum. The following cellular technologies recently standardized in 3GPP are meant to operate in licensed spectrum: enhanced coverage global system for mobile communication (GSM) based on general packet radio service (GPRS) standard in the context of Rel-13; the evolution of the LTE machine type communication (MTC) solution (commonly called Cat M1) which is based on an evolution of the legacy Cat 0; and narrowband (NB) IoT (NB-IoT), a new non backward compatible radio access technology which is specifically optimized in order to satisfy the requirements required for typical IoT solutions (commonly called Cat NB1). As eMTC and NB-IoT UEs will be deployed in huge numbers, lowering the cost of these UEs is a key enabler for implementation of IoT. Also, low power consumption is desirable to extend the life time of the battery. In summary, eMTC, and NB-IoT techniques are designed to ensure that the UEs have low cost, low power consumption, and enhanced coverage.

IoT is envisioned as a significantly important technology component, which has huge potential, and may change our daily life entirely by enabling connectivity between tons of devices. IoT has wide applications in various scenarios, including smart cities, smart environment, smart agriculture, and smart health systems.

3GPP has standardized two designs to support IoT services—enhanced Machine Type Communication (eMTC) and NarrowBand IoT (NB-IoT). As eMTC and NB-IoT UEs will be deployed in huge numbers, lowering the cost of these UEs is a key enabler for implementation of IoT. Also, low power consumption is desirable to extend the life time of the battery. In summary, eMTC, and NB-IoT techniques are designed to ensure that the UEs have low cost, low power consumption, and enhanced coverage.

DETAILED DESCRIPTION

Figure 1:
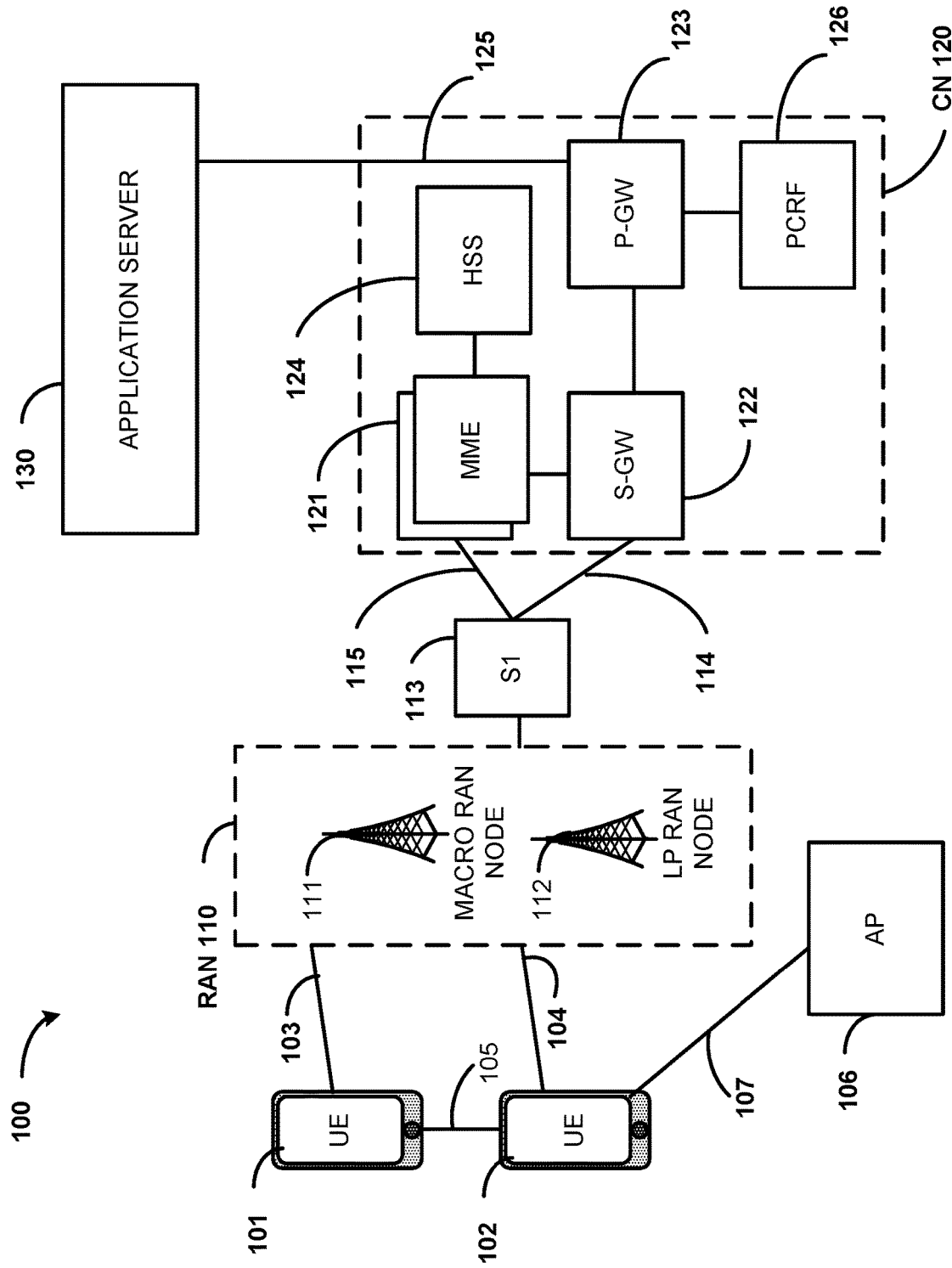
FIG. 1 is a block diagram illustrating an example network system with a UE, and eNB/gNB in a core network useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (UE) (e.g., mobile/wireless phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

Overview

In consideration of described deficiencies of radio frequency communication and synchronization operations, various aspects for unlicensed use of cellular IoT technologies to operate in unlicensed spectrum. Unlicensed IoT devices, for example, can fairly coexist with existing wireless technologies according to various aspects/embodiments described herein. Such techniques or networked IoT devices can be referred to herein as unlicensed IoT (U-IoT) and can be applicable to any IoT related standard from extended coverage GSM IoT (EC-GSM-IoT) to enhanced machine type communication (eMTC) or NB-IOT, for example.

IoT devices can operate in unlicensed spectrum with different deployment modes based on a time division duplex (TDD) or a frequency division duplex (FDD) of a new radio access technology (RAT). In some aspects, an IoT device can operate to generate an unlicensed IoT (U-IoT) communication based on frequency hopping operations, or frequency-hopping spread spectrum as a method transmitting radio signals by rapidly switching a carrier among many frequency channels, such as by using a pseudorandom sequence known to both transmitter and receiver. A radio frequency interface can be configured to communicate the U-IoT communication.

In an aspect, a base station (e.g., eNodeB (eNB) or (gNB) can operate to generate downlink communication comprising a paging message and a system information message to enable an unlicensed internet of things (U-IoT) communication that is an eMTC via one or more frequency hopping operations between different channels. As such, the structure of the signal information messaging can comprise frames separated into two different parts: an anchor segment and a data segment, which are different channels of different frequency bands along the 2.4 GHz band for enhanced Machine-Type Communication (eMTC).

The paging and system information message(s) can include paging information with a paging indication and a paging occasion window, as well as essential system information comprising a system information block (SIB) of MulteFire (MF) (SIB-MF) message that includes a SIB-A with the paging indication. The paging and system information message can be generated based a 2.4 GHz band of the anchor segment for an enhanced Machine-Type Communication (eMTC). Various structures and signaling operations can configured for frequency hopping operations as proposed herein.

Additional aspects and details of the disclosure are further described below with reference to figures.

Embodiments described herein can be implemented into a system using any suitably configured hardware and/or software. FIG. 1 illustrates an architecture of a system 100 of a network in accordance with embodiments/aspects herein. The system 100 is shown to include a user equipment (UE) 101 and a UE 102. The UEs 101 and 102 are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface.

Any of the UEs 101 and 102 can alternatively, or additionally, comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

IoT devices 101, 102 and further exemplified in other examples herein operate for eMTC communications based on signaling information and paging information via corresponding messages sent with frequency hopping operations on the 2.4 GHz band. These frequency hopping operations are used by a base station (e.g., nodes 111/112) to signal the paging and signaling messages to the UE 101/102 and put less constraint on power and network resources. They can be inter-spectrum/inter-channel, non-contiguous, or contiguous within a channel or different frequency bands of a 2.4 GHz bandwidth for eMTC. Inter-band spectrum can refer to different frequency spectrum bands (or frequency ranges) with time domain multiple carrier aggregation operable between the different spectrum bands instead of just within one band. Non-contiguous can refer to a non-continuous or non-touching component carrier within a band or between different bands (or ranges of frequency spectrum), for example. Non-contiguous time domain multiple carrier aggregation could be either intra-band, where the component carriers belong to the same operating frequency band, but could have one or more gaps in between, or it could be inter-band, in which case the component carriers belong to different operating frequency bands entirely and are also not contiguous.

The UEs 101 and 102 can be configured to connect, e.g., communicatively couple, with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

The UEs 101 and 102 can further directly exchange communication data via a ProSe interface 105. The ProSe interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 can include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

The UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some examples, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 101 and 102. The physical downlink control channel (PDCCH) can carry information about the transport format and resource allocations related to the PDSCH channel, among other things. It can also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an enhanced physical downlink control channel (ePDCCH) that uses PDSCH resources for control information transmission. The ePDCCH can be transmitted using one or more enhanced the control channel elements (eCCEs). Similar to above, each ECCE can correspond to nine sets of four physical resource elements known as an enhanced resource element groups (EREGs). An ECCE can have other numbers of EREGs in some situations.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

The CN 120 comprises the MMEs 121, the S-GW 122, the Packet Data Network (PDN) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the EPC network 123 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). The P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class of identifier (QCI), which commences the QoS and charging as specified by the application server 130.

In an aspect, the UE 101/102 and RAN 110 with RAN nodes 111, 112 can operate as IoT devices to communicate U-IoT communications based on frequency hopping of different parts/segments of a frame (MulteFire frame (mframe)) within a sub-band or subset of bands of a 2.4 GHz spectrum. The frame is partitioned into two different segments: an anchor segment and a data segment, each transmitted on different channels for the U-IoT communication as an eMTC communication for MulteFire IoT unanchored systems (not anchored to an LTE LAA anchor or the like in communications).

In an aspect, for system information, the anchor channel can be configured to carry synchronization signals (primary synchronization signal (PSS), secondary synchronization signals, or the like) and the PBCH. The data channel can carry the PDSCH. Additionally, either the anchor channel or the data channel can carry the MPDCCH for system information blocks. For example, the anchor channel can carry synchronization signals, PBCH and the MPDCCH on one frequency channel, and the data channel carries the PDSCH on another.

The system information can be divided into a Master Information Block/MasterInformationBlock (MIB) and a number of System information Blocks/SystemInformationBlocks (SIBs). The MIB can include a limited number of most essential and most frequently transmitted parameters to acquire other information from the cell or UE 101/102, and transmitted on a broadcast BCH. SIBs other than a System Information Block Type 1/SystemInformationBlockType1 (SIB 1) are carried in system information/SystemInformation (SI) messages and mapping of SIBs to SI messages is flexibly configurable by schedulingInfoList included in SystemInformationBlockType1, in which SIBs having the same scheduling requirement (periodicity) or occasion can be mapped to the same SI message; SystemInformationBlockType2 (SIB 2) is mapped to the SI message that corresponds to the first entry in the list of SI messages in schedulingInfoList.

For MulteFire (MF), SystemInformationBlockType2 is not necessarily mapped to any SI message, but can be transmitted within a SIB of Multi-Fire messages SystemInformationBlockTypeMF1. There may be multiple SI messages transmitted with the same periodicity. SystemInformationBlockType1 and SI messages are transmitted on DL-SCH.

The Bandwidth reduced Low Complexity (BL) UEs and UEs in Coverage Enhancement (CE) apply Bandwidth Reduced (BR) version of the SIB or SI messages. A UE considers itself in enhanced coverage as specified in MFA TS 36.304 [4]. In this and subsequent clauses, anything applicable for a particular SIB or SI message equally applies to the corresponding BR version unless explicitly stated otherwise.

The MF BL/CE UE applies the MF specific Bandwidth Reduced (BR-MF) version of the MIB, SIBs or SI messages. These are denoted MasterInformationBlock-BR-MF (MIB-BR-MF) and SystemInformationBlockTypeX-BR-MF.

Additionally, the MF BL/CE cell transmits SystemInformationBlockTypeA-BR-MF (SIB-A-BR-MF). In this and subsequent clauses, anything applicable for a particular SIB-BR or bandwidth reduced SI message equally applies to the corresponding BR-MF version unless explicitly stated otherwise.

SystemInformationBlockTypeMFx (SIB-MF), are defined. SIB-MFs other than SystemInformationBlockTypeMF1 are carried in SystemInformation-MF (SI-MF) messages, and a SI-MF message may include a 3GPP SystemInformation message containing 3GPP SIBs. The mapping of SIB-MFs and SIBs to SI-MF is configurable by schedulingInfoList included in SystemInformationBlockTypeMF1. SystemInformationBlockTypeMF1 and all SI-MF messages are transmitted on DL-SCH.

For MF, SystemInformationBlockTypeMF1 contains all mandatory parts of SystemInformationBlockType1 and SystemInformationBlockType2, plus additional MF specific information elements. Optional parts of SystemInformationBlockType1 and SystemInformationBlockType2 may also be included. SystemInformationBlockType2 is not mapped to any SI messages in schedulingInfoList in SystemInformationBlockType1.

For scheduling operations of MF, the MIB-MF provides the same content for a period of 40 ms, and repetitions of the same MIB-MF content may be made within these 40 ms. The SystemInformationBlockType1 uses a fixed schedule with a periodicity of 80 ms and repetitions made within 80 ms. The first transmission of SystemInformationBlockType1 is scheduled in subframe #5 of radio frames (or mframes) for which the SFN mod 8=0, and repetitions are scheduled in subframe #5 of all other radio frames for which SFN mod 2=0.

For BL UEs or UEs in CE, MIB is applied which may be provided with additional repetitions, while for SIB1 and further SI messages, separate messages are used which are scheduled independently and with content that may differ. The separate instance of SIB1 is named as SystemInformationBlockType1-BR. The SystemInformationBlockType1-BR uses a schedule with a periodicity of 80 ms. TBS for SystemInformationBlockType1-BR and the repetitions made within 80 ms are indicated via schedulingInfoSIB1-BR in MIB.

The MIB-BR-MF (or MIB MF) and SIB-A-BR-MF (SIB A) are scheduled with the MF BL/CE discovery signal. The MIB-BR-MF uses a fixed schedule with a periodicity of either 80 ms for 16 frequency hopping channels or 160 ms for 32 frequency hopping channels, for example, and can be transmitted 3 times in 2 consecutive subframes. The transmission of the MIB-BR-MF is scheduled in radio frames for which the SFN mod 8=0 or SFN mod 16=0, respectively. Within the radio frame, the MIB-BR-MF transmission may start in subframe #0 or subframe #1, which is indicated by an offset (the sf-Offset field) within the MIB-BR-MF payload.

The Paging message is used to inform UEs in RRC_IDLE and UEs in RRC_CONNECTED about a system information change. If the UE is in RRC_CONNECTED or is not configured to use a discontinuous reception cycle (DRX) cycle longer than the modification period in RRC_IDLE, and receives a Paging message including the systemInfoModification, it knows that the system information will change at the next modification period boundary. If a UE in RRC_IDLE is configured to use a DRX cycle longer than the modification period, and the notification is received in a Paging message including the systemInfoModification-eDRX, it acquires the updated system information at the next eDRX acquisition period boundary. Although the UE may be informed about changes in system information, no further details are provided e.g. regarding which system information will change, except if systemInfoValueTagSI is received by BL UEs or UEs in CE.

SystemInformationBlockType1 (SystemInformationBlockTypeA-BR-MF in MF BL/CE cells, or SIB A) includes a value tag system InfoValueTag that indicates if a change has occurred in the SI messages. UEs may use system InfoValueTag, e.g. upon return from out of coverage, to verify if the previously stored SI messages are still valid. Additionally, for other than BL UEs or UEs in CE or NB-IoT UEs, the UE considers stored system information to be invalid after a period of time (e.g., about 3 hours) from the moment it was successfully confirmed as valid, unless specified otherwise. BL UE or UE in CE considers stored system information to be invalid after another period of time (e.g., about 24 hours) from the moment it was successfully confirmed as valid, unless the UE is configured by parameter si-ValidityTime to consider stored system information to be invalid 3 hours after validity confirmation.

The SIB A or System Information Block Type A for BR-MF message can be used to convey information about data channels and also indication for paging and system information change. This can include a paging indication that indicates whether paging information is in a following data channel, as well as a frequency channel list indicating the frequency hopping channels to be used for data transmission. The channel list, in one example aspect, can be a bitmap with sets of one or more bits corresponding to different groups of frequency hopping channels. These groups, for example, can be consists of groups of four frequency hopping channels of 1.4 MHz each. The different groups, for example, can include 14 channels. The sets of one or more bits can indicate respectively whether each group is actively being used, the particular channels within each group, or both.

Figure 2:
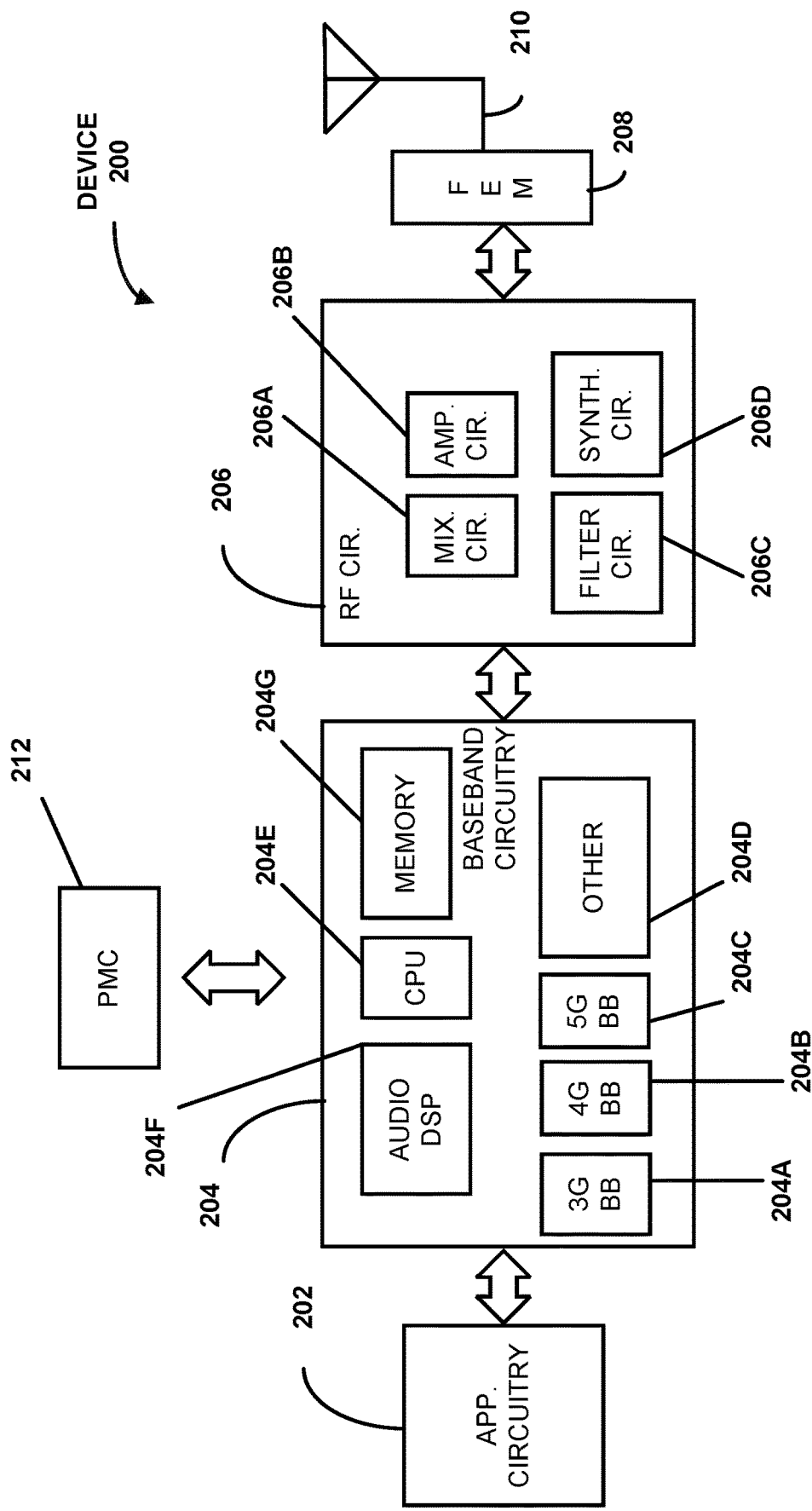
FIG. 2 is a diagram illustrating example components of a network device as a UE or eNB/gNB that can be employed in accordance with various aspects discussed herein.

FIG. 2 illustrates example components of a device 200 in accordance with some embodiments of devices that operate for beamforming via codebook subset restriction(s). In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a gNB, eNB, UE, a RAN node or other network device incorporating one or more various aspects/embodiments herein. In some embodiments, the device 200 can include less elements (e.g., a RAN node could not utilize application circuitry 202, and instead include a processor/controller to process IP data received from an EPC). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuity 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 can not receive data in this state, in order to receive data, it must transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
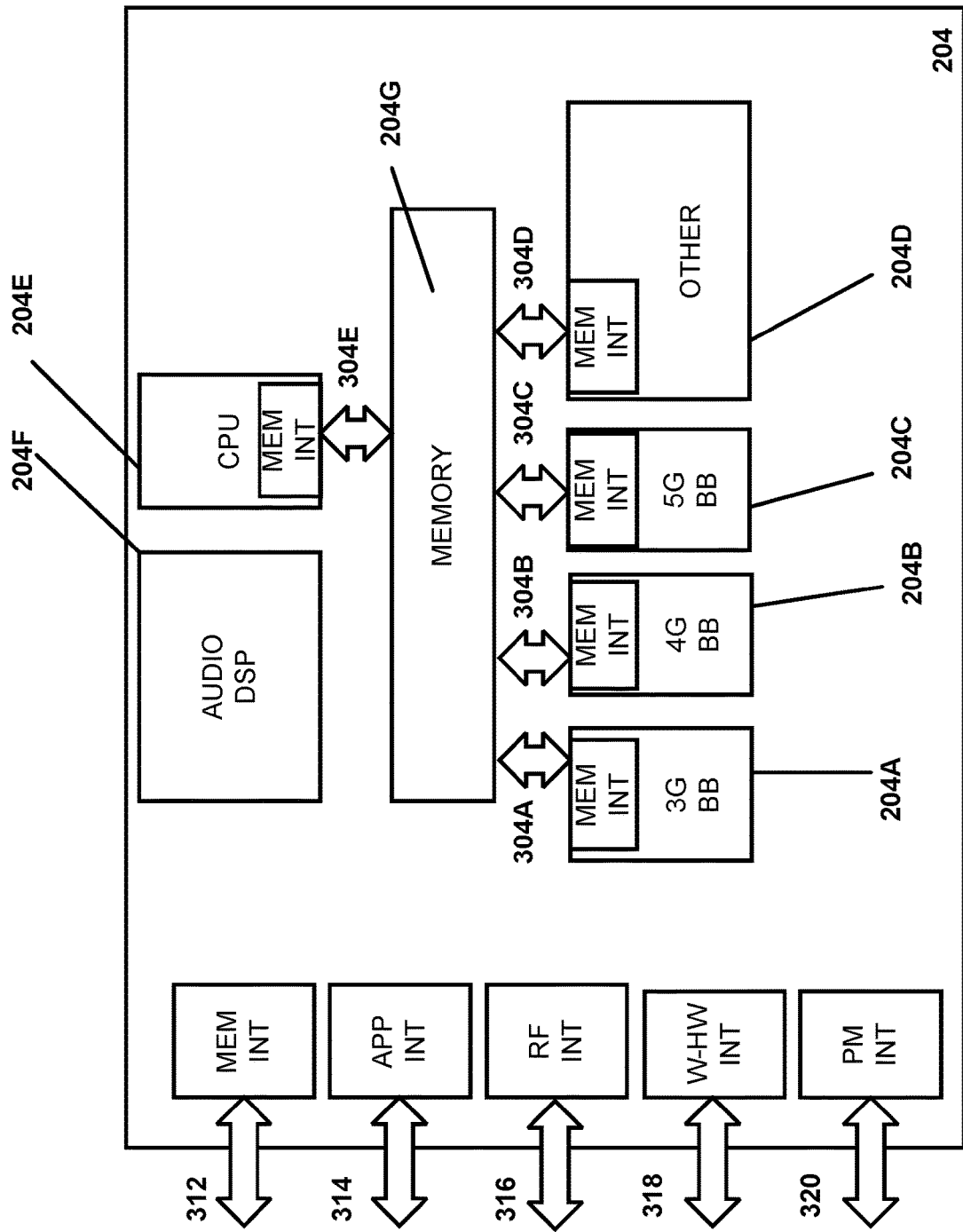
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

In addition, the memory 204G (as well as other memory components discussed herein, such as memory 430, memory 530 or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
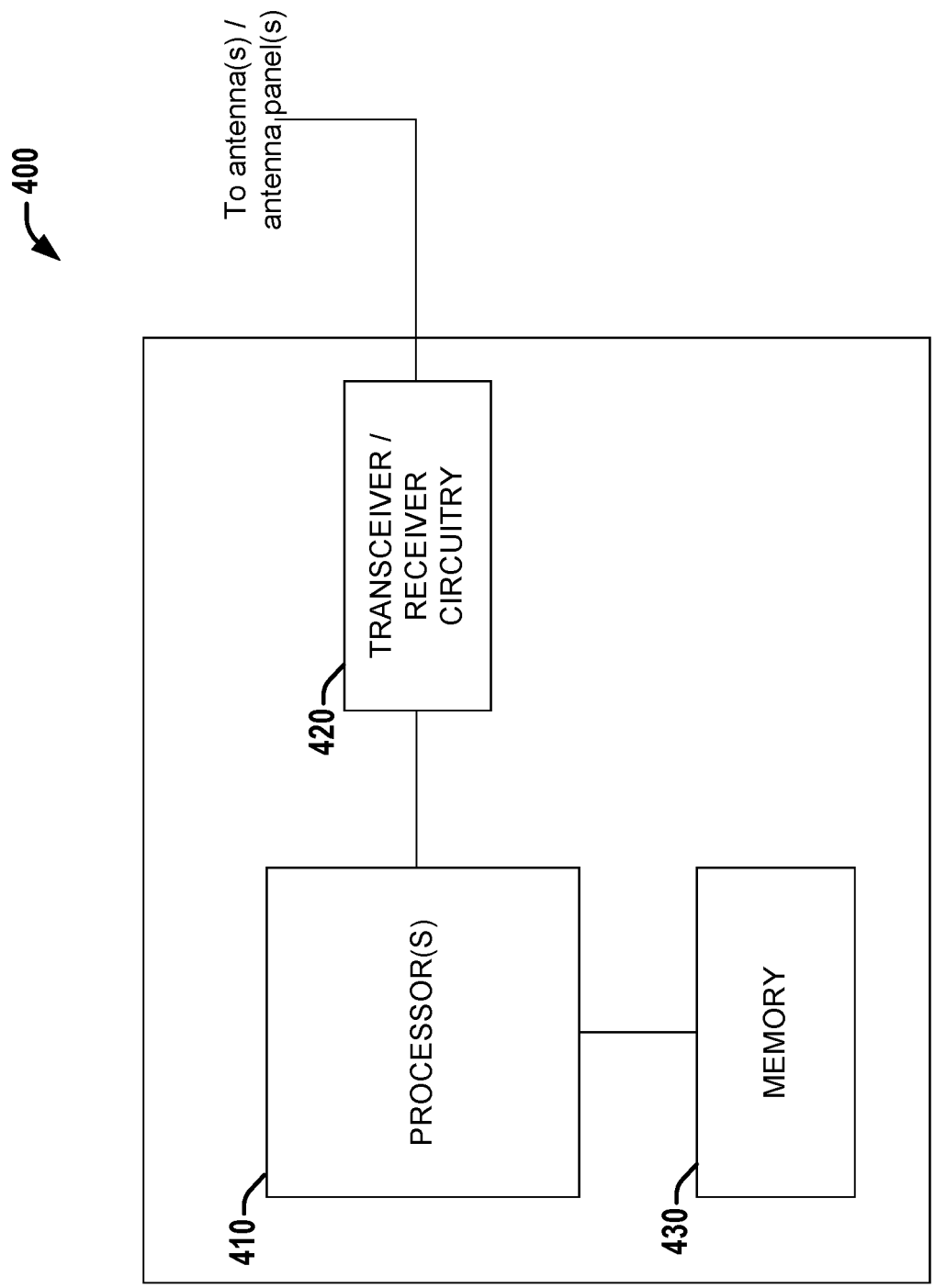
FIG. 4 is a block diagram illustrating a system employable at a UE that enables beam reporting and beam forming operations, according to various aspects described herein.

Referring to FIG. 4, illustrated is a block diagram of a system 400 employable at a UE (User Equipment) that facilitates or enables example transmission configuration for U-IoT transmission via frequency hopping operations, according to various aspects described herein. System 400 can include one or more processors 410 (e.g., one or more baseband processors such as one or more of the baseband processors discussed in connection with FIG. 2 and/or FIG. 3) comprising processing circuitry and associated memory interface(s) (e.g., memory interface(s) discussed in connection with FIG. 3), transceiver circuitry 420 (e.g., comprising one or more of transmitter circuitry or receiver circuitry, which can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE), for example, a MTC UE. As described in greater detail below, system 400 can facilitate frequency hopping based on the paging messages and system information messages communicated via anchor and data segments of different channels as described herein.

Figure 5:
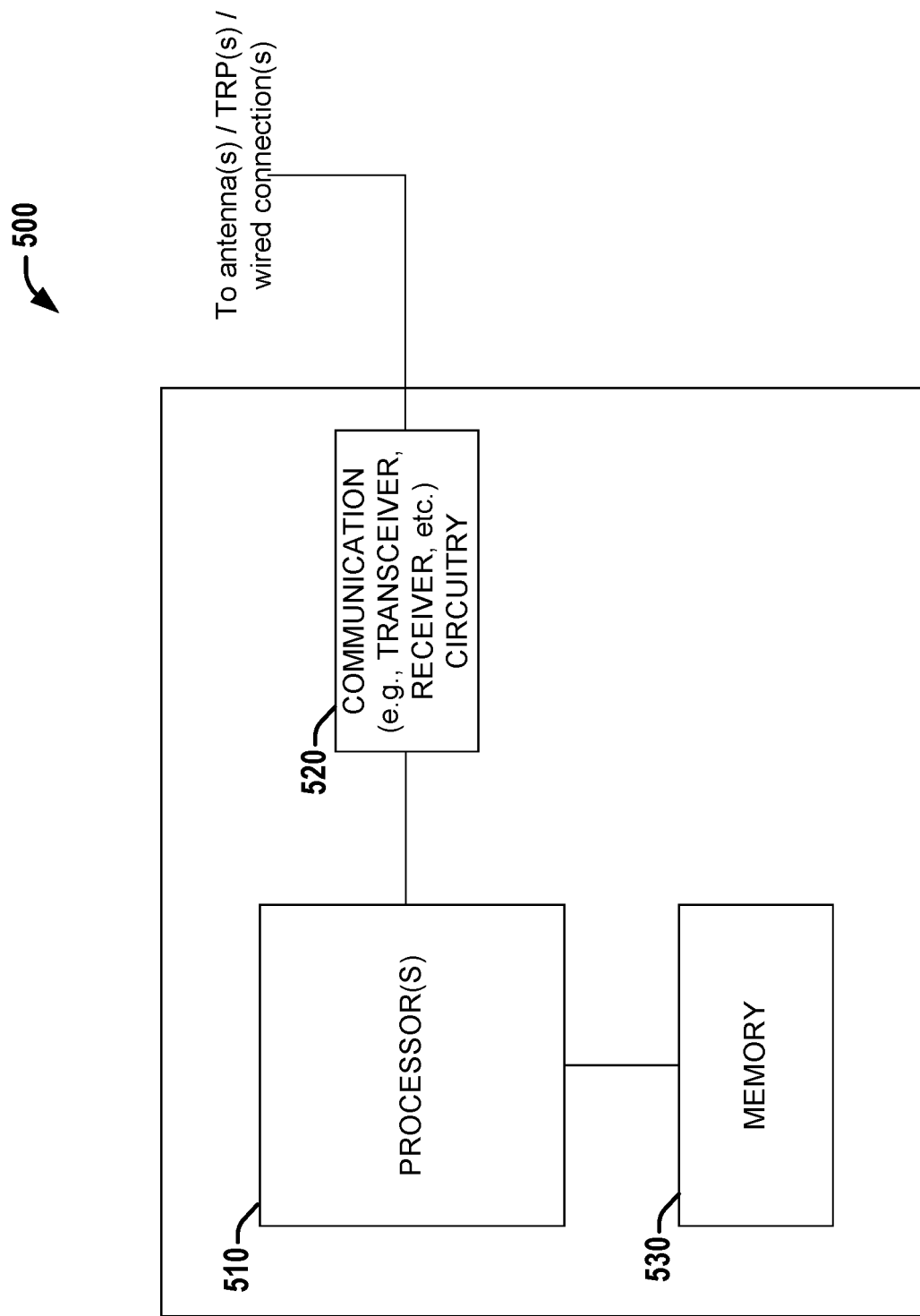
FIG. 5 is a block diagram illustrating a system employable at a base station (BS)/evolved NodeB (eNB)/new radio/next generation NodeB (gNB) that enables beam reporting and beam forming operations, according to various aspects described herein.

Referring to FIG. 5, illustrated is a block diagram of a system 500 employable at a BS (Base Station), gNB, eNB or other network device/component that enables example transmission configuration for U-IoT transmission via frequency hopping operations, according to various aspects described herein. System 500 can include one or more processors 510 (e.g., one or more baseband processors such as one or more of the baseband processors discussed in connection with FIG. 2 and/or FIG. 3) comprising processing circuitry and associated memory interface(s) (e.g., memory interface(s) discussed in connection with FIG. 3), communication circuitry 520 (e.g., which can comprise circuitry for one or more wired (e.g., X2, etc.) connections and/or transceiver circuitry that can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station in a wireless communications network. In some aspects, the processor(s) 510, communication circuitry 520, and the memory 530 can be included in a single device, while in other aspects, they can be included in different devices, such as part of a distributed architecture. As described in greater detail below, system/device 500 can enable frequency hopping on U-IoT communications of eMTC based on the paging messages and system information messages communicated via anchor and data segments of different channels as described herein.

Figure 6:
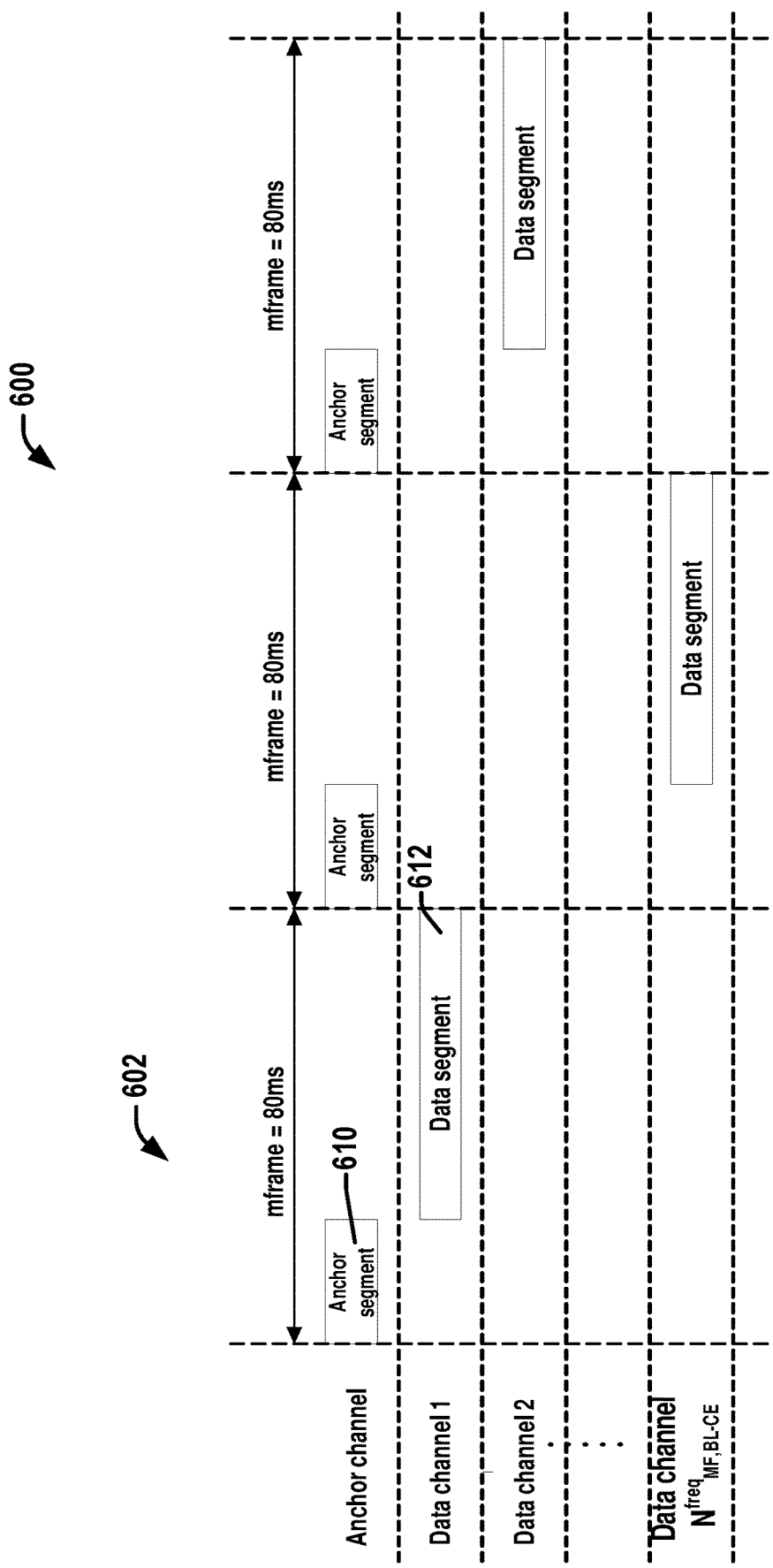
FIG. 6 illustrates an example transmission configuration for U-IoT transmission via frequency hopping operations according to various aspects or embodiments described herein.

Referring to FIG. 6, illustrated is a transmission 600 based on frequency hopping for U-IoT communications in accordance with aspects described herein. The transmission 600 can be an eMTC transmission from the gNB 111/112 to the UE 101/102 to enable U-IoT communication. The transmission 600 can be configured into frames or mframes 602 for MF communication along the 2.4 GHz band for eMTC.

The transmission 600 can include one or more mframes, such as about three mframes, for example. Each mframe 602 of the transmission 600 can comprise about 80 milliseconds (ms), and be configured into two parts: an anchor segment 610 and a data segment 612. The transmission 600 can be generated and communicated via frequency hopping operations between the anchor segment 610 and the data segment 612 on different frequencies. Further, data segments 612 of each mframe 602 within the transmission 600 can be on a different channel frequency of a 2.4 GHz bandwidth.

Figure 7:
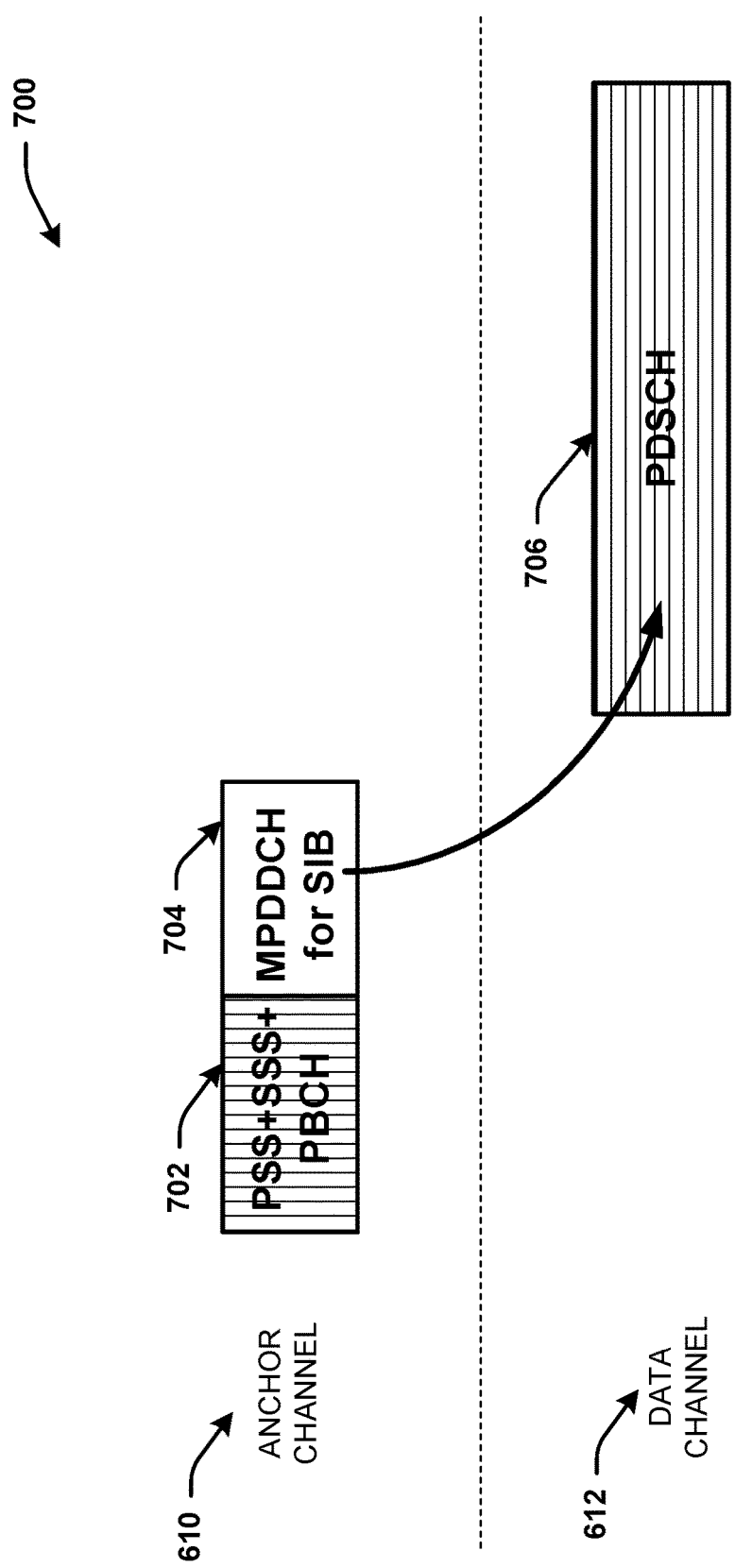
FIG. 7 illustrates another example transmission configuration for U-IoT transmission via frequency hopping operations according to various aspects or embodiments described herein.

Referring to FIG. 7, illustrated is a transmission of a frame or mframe 700 for paging and signal information messages to enable U-IoT communications of eMTC in the 2.4 GHz band.

In an aspect, for system information, the anchor channel 610 can be configured to carry synchronization signals (primary synchronization signal (PSS), secondary synchronization signals, or the like) and the PBCH in the anchor segment 602. The data channel 612 can be configured to carry the PDSCH in the data segment 606. Additionally, either the anchor channel 610 or the data channel 612 can carry the MPDCCH for system information blocks in the segment 604. For example, the anchor channel 610 can carry synchronization signals, PBCH and the MPDCCH on one frequency channel 612, and the data channel carry the PDSCH on another frequency channel for eMTC communication.

As such, the gNB 111/112 can segment a frame of the transmitted message transmission can be segmented into different parts for frequency hopping. Both Rel-13 eMTC and NB-IoT operates in licensed spectrum. On the other hand, the scarcity of licensed spectrum in low frequency band results in a deficit in the data rate boost. Thus, emerging interests in the operation of LTE systems in unlicensed spectrum continues to emerge. Potential LTE operation in unlicensed spectrum includes, but is not limited to the Carrier Aggregation based on LAA/eLAA systems, LTE operation in the unlicensed spectrum via dual connectivity (DC), and the standalone LTE system in the unlicensed spectrum, where LTE-based technology solely operates in unlicensed spectrum without requiring an "anchor" in licensed spectrum—called MulteFire (MF).

The unlicensed frequency band utilized by the frequency hopping operations can be the 2.4 GHz band for U-IoT in MF. For global availability, the design could abide by the regulations in different regions, e.g. the regulations given by FCC in US and the regulations given by ETSI in Europe. Based on different regulations (e.g., by FCC in US, regulations given by ETSI in Europe, or others), frequency hopping can be more appropriate than other forms of modulations, due to more relaxed power spectrum density (PSD) limitation and co-existence with other unlicensed band technology such as Bluetooth and WiFi. Specifically, frequency hopping has no power spectrum density (PSD) limit while other wide band modulations may have a PSD limit of 10 dBm/MHz in regulations given by ETSI, for example. This low PSD limit could result in limited coverage.

As such, the frames/mframes of transmissions 700 can be U-IoT communications for MulteFire on the eMTC-U that are configured for frequency hopping. There can be two types of frequency hopping operations/systems that can be utilized: adaptive and non-adaptive. In both case, essential system information, such as DRS, PBCH, paging, etc., can be transmitted on a limited number of anchor channels to reduce UE search time, and power consumption. For example, the anchor segments, including PSS/SSS/PBSCH 702 and MPDDCH for SIB 704 can be transmitted on a same channel 610, while data segments are carried on other non-anchor channels 612 within the bandwidth for eMTC in MF with PDSCH 706.

Paging in idle mode can refer to synchronization mechanism between the UE 101/102 wake up time, monitor the paging channel PDCCH and the time the eNB/gNB 111/112 delivers paging information. In MF 1.0 and LTE, this mechanism is done by DRX synchronization. In release 13 LTE, an extended version of DRX (eDRX) is deployed that allows the UE to sleep a maximum of about 43.69 minutes.

In MF 1.0, in order for eNB to page the UE, there is a need to find the paging frame (PF), and then the paging occasion window (POW). PF can be defined by: system frame number (SFN) mod T=(T div N)*(UE_ID mod N), where T can be the periodicity of the SI message, UE_ID be the particular UE identification (ID), and N a dimensioned number (e.g., max or min of a threshold). POW starts at PF and is defined by the following parameters configured by RRC message: POW_size (range 1 to 10 SF) and pagelessSubframesTo-Monitor (1 to 10 SF).

In various embodiments/aspects, the transmission and frames of the transmission for paging and system information can configure a PDCCH under frequency hopping system for U-IOT that can take advantage of the DRX and eDRX mechanism in MF 1.0 and LTE.

In one embodiment, the MPDCCH of SIB-MF can be transmitted on the anchor channel 610. Alternatively, or additionally, a channel index for SIB-MF on the MPDCCH can be configured by MIB through PBCH. The MPDCCH of SIB-MF can be transmitted on multiple contiguous subframes or non-contiguous subframes.

In an aspect, the PDSCH of SIB-MF can be transmitted on the data channel 612 with a channel offset between the MPDCCH and the PDSCH being indicated by Downlink Control Information (DCI). The PDSCH can also be spanned across multiple contiguous or non-contiguous subframes.

In another embodiment, the SIB-MF as a SIB-BR-MF for eMTC can include a channel list or whitelist for frequency hopping. The channel list can comprise a bitmap with one or more bits corresponding to a group of one or more frequency channels among various groups, as well as one or more frequency channels within a corresponding group.

For example, the bitmap can correspond to four groups of frequency channels with about fourteen frequency channels, respectively. Each channel can include about 1.4 MHz. The bitmap, for example, can be about 14 bits with each bit indicating about four channels that could be used by the UE 101/102 and the gNB 111/112 for frequency hopping. As such, the bitmap of the channel list can indicate about 56 channels in four groups of fourteen channels and whether each group or channel is to be used or not in frequency hopping operations.

In an aspect, the anchor channel 610 can be configured to carry the channel list (white list) or channel bitmap for frequency hopping. The anchor channel 610 can further carry or comprise essential system information comprising a SIB MF (with a SIB-A/SIB-A-BR-MF) that enables a completion of a Random Access Channel (RACH) procedure or a Radio Resource Control (RRC) connection, a SIB1, a flag for a paging indication, as well as the channel list of frequency hopping channels for frequency hopping.

The anchor channel 610 can carry one or more of these blocks or channel lists indicating channels used in frequency hopping, along with a one bit indication or flag. This indication or flag can provide information or an indication as to whether or not remaining system information not carried on the anchor channel 610 are in the next data channel 612 or other following data channel in another frame, for example. This other information, for example, can be a SIB2 on the next or following data channel 612 or downlink/uplink information for eMTC transmission.

For example, the gNB 111/112 can operate to generate an indication via at least one of a MIB or a SIB in a PBCH of a channel for paging transmission comprising a PDCCH and a PDSCH, or the PDCCH. The SIB-A can be carried via a MPDCCH 704 on an anchor channel as the anchor segment (702+704), wherein the SIB-A comprises a paging indication or a bit that indicates whether paging information is carried on a subsequent data channel 706.

In another aspect, the anchor channel 610 can be configured with an additional bit field that indicates whether or not SIB2 is transmitted in a next or following data segment/channel 706. An additional bit field can also be configured on the anchor channel 610 to indicate whether or not paging/paging data is being transmitted on data channels 706 or other following frames of a transmission 600, for example.

In other aspects, frequency hopping can be generated by the gNB 111/112 or the UE 101/102 in order to reduce a dwell time on the anchor channel 610 for the U-IoT communication compared to LTE paging operations by reducing information thereon and including it on a data segment on a non-anchor channel. The gNB 111/112 can generate the one or more frequency hopping operations by generating essential system information on the anchor segment 610 and other system information (DL/UL data enabling unanchored or MF transmission by the UE) on the data segment 612 and thus operate on the anchor segment with an N times shorter dwell time than on the data segment, wherein N is an integer greater than one. For example, about a ten to fifteen times shorter dwell on the anchor 610 can be configured than on the data channel 612. For example, the anchor segment 610 of the frequency hopping operations configured via the gNB 111/112 can include about a 5 ms dwell time and the data segment 612 of the data channel can include about a 75 ms dwell time.

For paging transmissions, the MPDCCH for paging can be transmitted on the anchor channel 610 and the PDSCH for paging transmitted on the non-anchor channel 612. As such, to minimize the dwell time of anchor channel, only the PDCCH is transmitted on the anchor channel 610. The channel index for the corresponding PDSCH, where the page message is transmitted, can be indicated in the DCI. A subframe offset can also be configured/indicated in the DCI, to satisfy an on-off regulation in the non-adaptive FH system, as well as maximum utilization (MU) requirement (e.g., a 10% MU for non-adaptive frequency hopping spread spectrum (FHSS) systems for the UL.

For Listen Before Talk (LBT) based adaptive FH systems, a presence detection can be performed before paging PDSCH reception. In addition, or alternatively, the period of an anchor channel 610 can be a subset of a DRX period.

In an embodiment, as described above, to avoid the UE having to monitor the PDCCH in idle in order to determine when paging may actually be transmitted, the anchor cannel 610 could carry an additional bit that indicates whether or not paging is transmitted in one or more subsequent data channels. This can be advantageous in order to reduce power consumption overhead.

For co-existence between paging and SIB transmission, various aspects can also be utilized by network devices (e.g., eNB/gNB 111/112/500, UE 101/102/400, or other device). In one embodiment, the MPDCCH for SIB, and MPDCCH for paging can be either Frequency Division Multiplexed (FDMed)/Time Division Multiplexed (TDMed) on the anchor or non-anchor channel. In another embodiment, the MPDCCH for SIB and MPDCCH for paging can be enabled on different occasions (e.g., paging occasion or transmission opportunities/segments) with respect to time/frequency resource.

Figure 8:
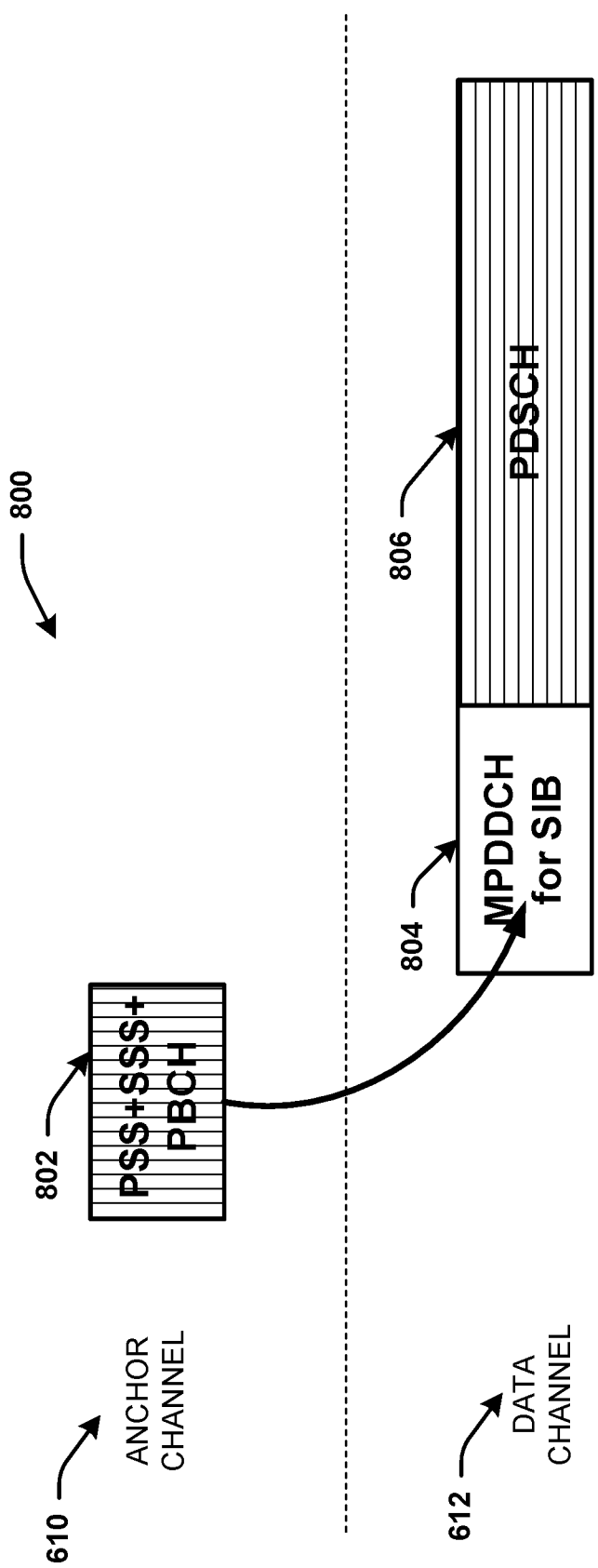
FIG. 8 illustrates example transmission configuration for U-IoT transmission via frequency hopping operations according to various aspects or embodiments described herein.

Referring to FIG. 8, illustrated is another embodiment for frequency hopping to signal or generate U-IoT transmission in accordance with the various aspects/embodiments described herein. Similar to FIG. 7, the anchor channel 610 can be configured to carry synchronization signals (primary synchronization signal (PSS), secondary synchronization signals, or the like) and the PBCH in the anchor segment 802. The data channel 612 can be configured to carry the PDSCH in the data segment 806. Additionally, the data channel 610 can carry the MPDCCH segment 804 on the data channel carry with the PDSCH 806 on another frequency channel for eMTC communication.

Figure 9:
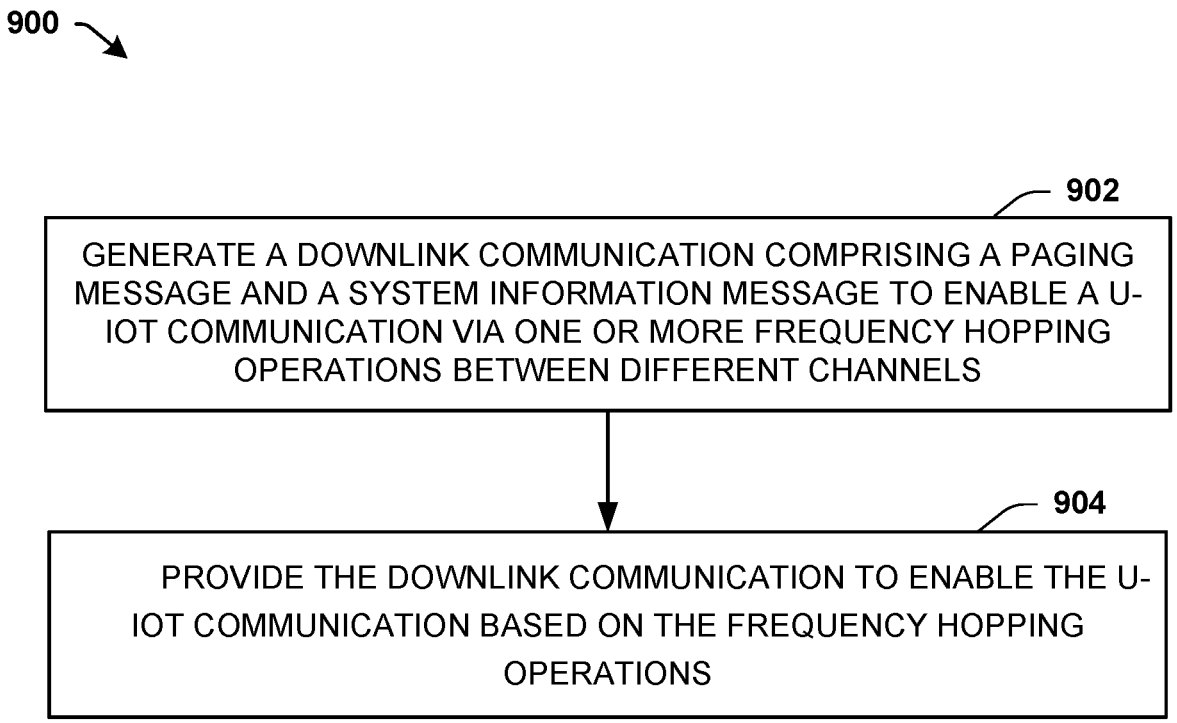
FIG. 9 illustrates a process flow of processing or generating U-IoT transmission via frequency hopping operations according to various aspects or embodiments described herein.

Referring to FIG. 9, illustrated is a process flow 900 of a gNB device for performing paging and system information messaging for U-IoT communications by providing paging information and essential system information blocks to a UE via frequency hopping.

At 902, the process flow 900 initiates with generating a downlink communication comprising a paging message and a system information message to enable a U-IoT communication via one or more frequency hopping operations between different channels, the downlink communication comprising anchor segments of an anchor channel and data segments of a plurality of data channels.

At 904, the process flow continues with providing the downlink communication to enable the U-IoT communication based on the frequency hopping operations.

The downlink communication can comprise the data segments as a plurality of different non-anchor channels at different 80 ms windows with the anchor segment as an anchor channel, respectively. The data segments can comprise different frequencies from one another, and the anchor channel can comprise a different frequency than the plurality of data channels.

The gNB, for example, can generate the system information message by generating essential system information on the anchor channel and any other system information on a data segment of the plurality of data channels via the one or more frequency hopping operations, wherein the essential system information comprises at least one of: a SIB-MF on an MPDCCH, or the SIB-MF on a Physical Downlink Shared Channel (PDSCH). The SIB-MF can comprise at least one of: a channel list indicating channels being used for frequency hopping, a SIB 1, or a SIB 2. By generating frequency hopping with such configurations as described, the gNB can reduce a dwell time on the anchor channel. For example, the PDCCH can be generated only on the anchor channel for the downlink communication, while the PDSCH can be generated at a different occasion and a non-anchor channel.

Figure 10:
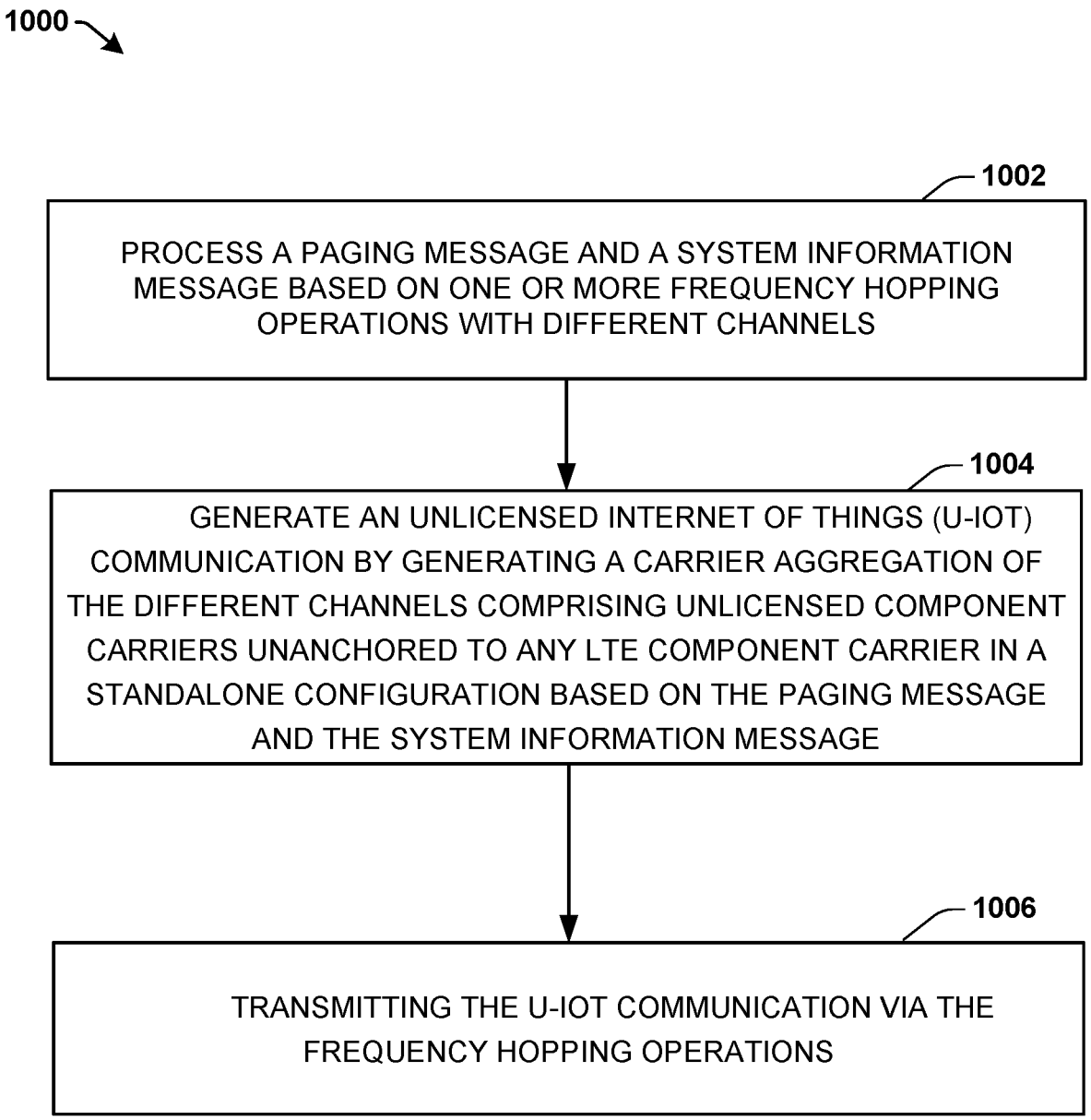
FIG. 10 illustrates another process flow of processing or generating a U-IoT transmission via frequency hopping operations according to various aspects or embodiments described herein.

Referring to FIG. 10, illustrated is an example process flow 1000 for transmitting/receiving/processing/generating U-IoT communications based on paging and system information message(s) via frequency hopping operations from the gNB.

At 1002, the process flow 1000 includes processing a paging message and a system information message based on one or more frequency hopping operations with different channels as described in various aspects/embodiments herein.

At 1004, the process flow 1000 continues with generating an unlicensed internet of things (U-IoT) communication by generating a carrier aggregation of the different channels comprising unlicensed component carriers unanchored to any LTE component carrier in a standalone configuration based on the paging message and the system information message.

At 1006, the process flow 1000 comprises transmitting the U-IoT communication via the frequency hopping operations.

In other aspects, the UE can operate to process the paging message and the system information message in a downlink communication associated with a 2.4 GHz band of the anchor segment for an eMTC in a MF protocol as the U-IoT communication, wherein the paging and system information can comprise a SIB-MF on a MPDCCH on a different occasion for a time/frequency resource than a MPDCCH for paging information, or on a PDSCH. The SIB-MF can comprise at least one of: a channel list indicating channels being used for frequency hopping, a SIB 1, or a SIB 2.

In other aspects, the UE (e.g., UE 101/102/400) can monitor only the anchor channel for the paging information carried on the MPDCCH from a broadcast communication, and update one of: a channel list for a non-Listen Before Talk (LBT) frequency hopping operation, or a non-skip hopping channel list in an LBT frequency hopping operation.

Figure 11:
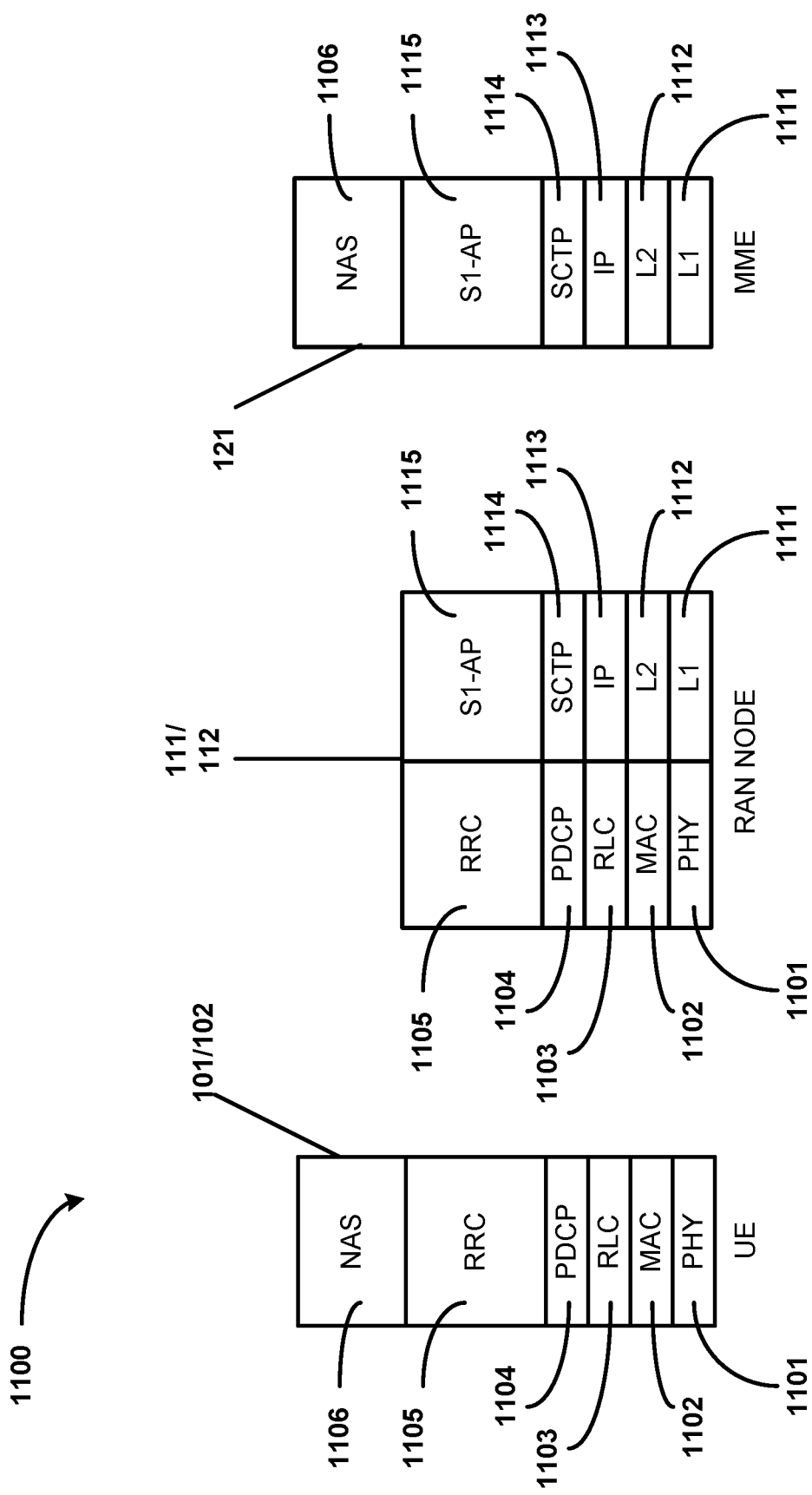
FIG. 11 illustrates a control plane protocol stack that can be implemented for operation of various embodiments and aspects described herein.

FIG. 11 is an illustration of a control plane protocol stack in accordance with various embodiments described herein. In this embodiment, a control plane 1100 is shown as a communications protocol stack between the UE 101 (or alternatively, the UE 102), the RAN node 111 (or alternatively, the RAN node 112), and the MME 121.

The PHY layer 1101 may transmit or receive information used by the MAC layer 1102 over one or more air interfaces. The PHY layer 1101 may further perform link adaptation or adaptive modulation and coding (AMC), power control, cell search (e.g., for initial synchronization and handover purposes), and other measurements used by higher layers, such as the RRC layer 1105. The PHY layer 1101 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1102 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1103 may operate in a plurality of modes of operation, including: Transparent Mode (TM), Unacknowledged Mode (UM), and Acknowledged Mode (AM). The RLC layer 1103 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1103 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1104 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1105 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 1101, the MAC layer 1102, the RLC layer 1103, the PDCP layer 1104, and the RRC layer 1105.

The non-access stratum (NAS) protocols 1106 form the highest stratum of the control plane between the UE 101 and the MME 121. The NAS protocols 1106 support the mobility of the UE 101 and the session management procedures to establish and maintain IP connectivity between the UE 101 and the P-GW 123.

The S1 Application Protocol (S1-AP) layer 1115 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1114 may ensure reliable delivery of signaling messages between the RAN node 111 and the MME 121 based, in part, on the IP protocol, supported by the IP layer 1113. The L2 layer 1112 and the L1 layer 1111 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 1111, the L2 layer 1112, the IP layer 1113, the SCTP layer 1114, and the S1-AP layer 1115.

Figure 12:
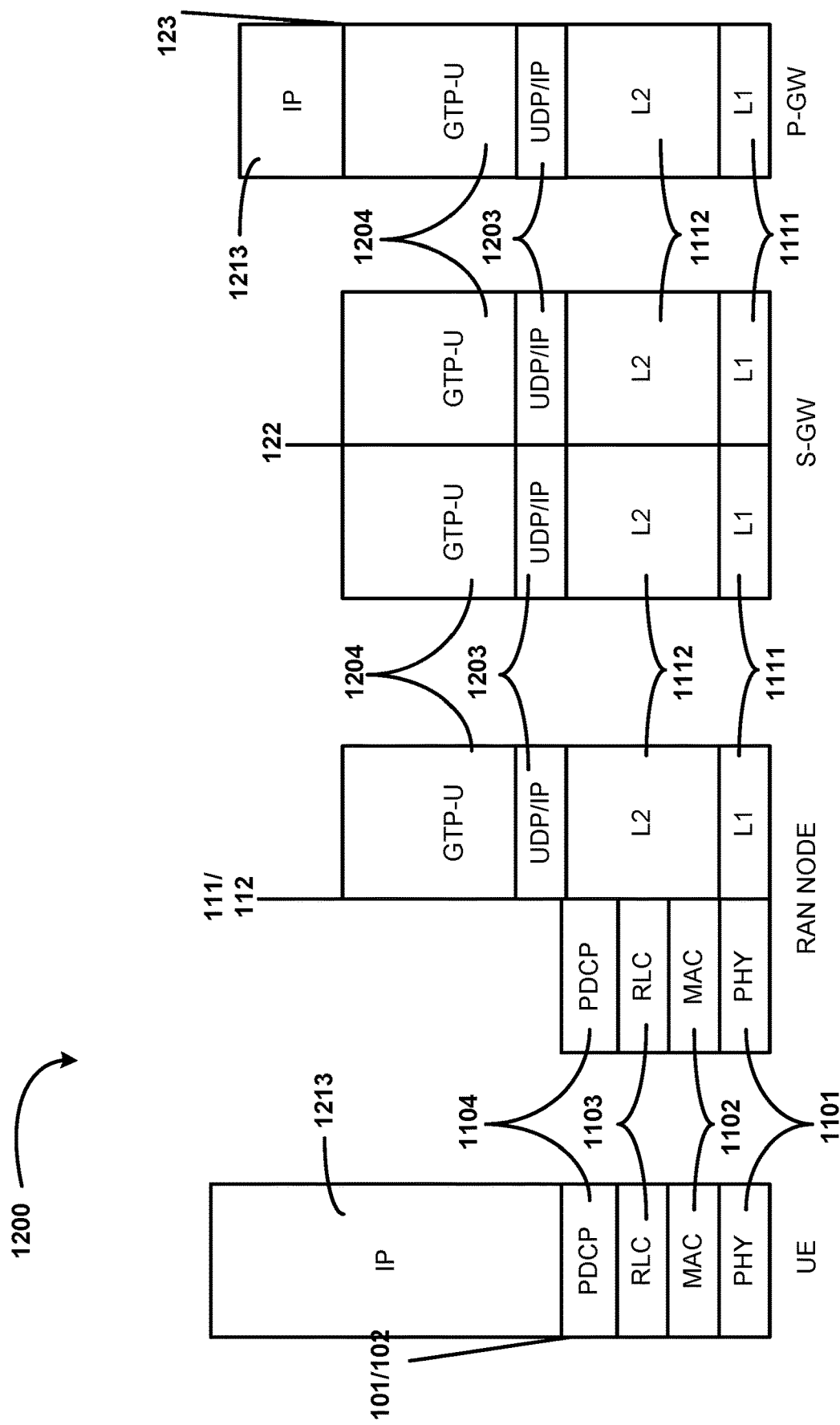
FIG. 12 illustrates user plane protocol stack that can be implemented for operation of various embodiments and aspects described herein.

FIG. 12 is an illustration of a user plane protocol stack in accordance with one or more embodiments herein. In this embodiment, a user plane 1200 is shown as a communications protocol stack between the UE 101 (or alternatively, the UE 102), the RAN node 111 (or alternatively, the RAN node 112), the S-GW 122, and the P-GW 123. The user plane 1200 may utilize at least some of the same protocol layers as the control plane 1100. For example, the UE 101 and the RAN node 111 may utilize a Uu interface (e.g., an LTE-Uu interface) to exchange user plane data via a protocol stack comprising the PHY layer 1101, the MAC layer 1102, the RLC layer 1103, the PDCP layer 1104.

The General Packet Radio Service (GPRS) Tunneling Protocol for the user plane (GTP-U) layer 1204 may be used for carrying user data within the GPRS core network and between the radio access network and the core network. The user data transported can be packets in any of IPv4, IPv6, or PPP formats, for example. The UDP and IP security (UDP/IP) layer 1203 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 1111, the L2 layer 1112, the UDP/IP layer 1203, and the GTP-U layer 1204. The S-GW 122 and the P-GW 123 may utilize an S5/S8a interface to exchange user plane data via a protocol stack comprising the L1 layer 1111, the L2 layer 1112, the UDP/IP layer 1203, and the GTP-U layer 1204. As discussed above with respect to FIG. 11, NAS protocols support the mobility of the UE 101 and the session management procedures to establish and maintain IP connectivity between the UE 101 and the P-GW 123.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Other examples of the various aspects/embodiments herein can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus configured to be employed in a next generation or new radio NodeB (gNB) device comprising: one or more processors configured to: generate a downlink communication comprising a paging message and a system information message to enable an unlicensed internet of things (U-IoT) communication via one or more frequency hopping operations between different channels comprising an anchor segment of a long term evolution (LTE) licensed band and a data segment of a data channel; and provide the downlink communication to enable the U-IoT communication; a radio frequency (RF) interface, configured to provide, to RF circuitry, data for transmission related to the downlink communication for the transmission.

Example 2 includes the subject matter of Example 1, wherein the system information message comprises at least one of: essential system information comprising a system information block (SIB) of MulteFire (MF) (SIB-MF) to complete a Random Access Channel (RACH) procedure or a Radio Resource Control (RRC) connection, a SIB1, a flag for paging indication and a channel list of frequency hopping channels for frequency hopping, wherein the paging message and system information message are based on a 2.4 GHz band of the anchor segment for an enhanced Machine-Type Communication (eMTC).

Example 3 includes the subject matter of any one of Examples 1-2, including or omitting any elements/features as optional, wherein the data channel comprises uplink and downlink transmission information on a different frequency than the anchor channel to enable the eMTC, and wherein the channel list of frequency hopping channels comprises a bitmap indicating channels or groups of channels being used for the frequency hopping operations between the different channels.

Example 4 includes the subject matter of any one of Examples 1-3, including or omitting any elements/features as optional, wherein the one or more processors are further configured to: generate the frequency hopping operations between the anchor segment as an anchor channel and the data segment of the data channel based on a 5 millisecond (ms) dwell time for the anchor channel and a 75 ms dwell time on the data channel.

Example 5 includes the subject matter of any one of Examples 1-4, including or omitting any elements/features as optional, wherein the one or more processors are further configured to generate the downlink communication with a SIB-MF on a MulteFire Physical Downlink Control Channel (MPDCCH) on the anchor segment and a Physical Downlink Shared Channel (PDSCH) on the data channel via the one or more frequency hopping operations.

Example 6 includes the subject matter of any one of Examples 1-5, including or omitting any elements/features as optional, wherein the one or more processors are further configured to generate an indication of a subframe offset between a MPDCCH and a PDSCH on the data segment on the data channel via Downlink Control Information (DCI).

Example 7 includes the subject matter of any one of Examples 1-6, including or omitting any elements/features as optional, wherein the one or more processors are further configured to: generate the anchor segment comprising a PSS, a SSS, a PBCH, and a MPDCCH with essential SIB information (SIB-A).

Example 8 includes the subject matter of any one of Examples 1-7, including or omitting any elements/features as optional, wherein the one or more processors are further configured to generate the one or more frequency hopping operations by generating the essential system information on the anchor segment and other system information on the data segment, wherein a SIB-A of the SIB-MF comprises a paging indication configured to indicate whether a paging transmission is performed in a following data channel.

Example 9 includes the subject matter of any one of Examples 1-8, including or omitting any elements/features as optional, wherein the one or more processors are further configured to generate the anchor segment on an anchor channel comprising a primary synchronization signal (PSS), a secondary synchronization signal (SSS), and a physical broadcast channel (PBCH), and configured to generate a Physical Downlink Shared Channel (PDSCH) on the data channel, and wherein the anchor segment further comprises an MPDCCH for the SIB-A.

Example 10 includes the subject matter of any one of Examples 1-9, including or omitting any elements/features as optional, wherein the one or more processors are further configured to generate at least one of: the MPDCCH with the SIB-MF or the PDSCH over multiple contiguous subframes or multiple non-contiguous subframes.

Example 11 includes the subject matter of any one of Examples 1-9, including or omitting any elements/features as optional, wherein the one or more processors are further configured to: generate essential system information on the anchor segment comprising a channel list indicating which channels are being used for frequency hopping, wherein the channel list comprises a bitmap indicating the channels being used based on four groups of fourteen channels.

Example 12 includes the subject matter of any one of Examples 1-10, including or omitting any elements/features as optional, wherein the one or more processors are further configured to: configure a channel index for a SIB-MF of a MPDCCH transmission via a Master Information Block (MIB) of a PBCH.

Example 13 includes the subject matter of any one of Examples 1-12, including or omitting any elements/features as optional, wherein the one or more processors are further configured to: generate a SIB-A via a MPDCCH on an anchor channel as the anchor segment, wherein the SIB-A comprises a paging indication that indicates whether paging information is carried on a subsequent data channel.

Example 14 includes the subject matter of any one of Examples 1-13, including or omitting any elements/features as optional, wherein the one or more processors are further configured to: generate paging information of PDCCH on the anchor segment as an anchor channel, and paging information of PDSCH on the data segment as a non-anchor channel.

Example 15 includes the subject matter of any one of Examples 1-14, including or omitting any elements/features as optional, wherein the one or more processors are further configured to: indicate a channel index of the paging information of the PDSCH via a DCI.

Example 16 includes the subject matter of any one of Examples 1-15, including or omitting any elements/features as optional, wherein the one or more processors are further configured to: indicate a subframe offset between the PDCCH and the PDSCH via a DCI, wherein a period of the anchor channel comprises a subset of a discontinuous reception period.

Example 17 includes the subject matter of any one of Examples 1-16, including or omitting any elements/features as optional, wherein the one or more processors are further configured to: generate an indication via at least one of a MIB or a SIB in a PBCH of a channel for paging transmission comprising a PDCCH and a PDSCH, or the PDCCH.

Example 18 is a computer-readable storage medium storing executable instructions that, in response to execution, cause one or more processors of a next generation or new radio NodeB (gNB) device to perform operations, comprising: generating a downlink communication comprising a paging message and a system information message to enable an unlicensed internet of things (U-IoT) communication via one or more frequency hopping operations between different channels, the downlink communication comprising anchor segments of an anchor channel and data segments of a plurality of data channels; and providing the downlink communication to enable the U-IoT communication based on the frequency hopping operations.

Example 19 includes the subject matter of Example 18, including or omitting any elements/features as optional, wherein the downlink communication comprises the data segments as a plurality of different non-anchor channels at different 80 ms windows with the anchor segment as an anchor channel, respectively, wherein the data segments comprise different frequencies from one another, wherein the anchor channel comprises a different frequency than the plurality of data channels.

Example 20 includes the subject matter of any one of Examples 18-19, including or omitting any elements/features as optional, wherein the operations further comprises: generating a MulteFire Physical Downlink Control Channel (MPDCCH) for an essential system information block (SIB) on a different occasion than a MPDCCH for paging.

Example 21 includes the subject matter of any one of Examples 18-20, including or omitting any elements/features as optional, wherein the operations further comprise: generating the system information message by generating essential system information on the anchor channel and other system information on a data segment of the plurality of data channels via the one or more frequency hopping operations, wherein the essential system information comprises at least one of: a SIB-MF on an MPDCCH, or the SIB-MF on a Physical Downlink Shared Channel (PDSCH); wherein the SIB-MF comprises at least one of: a channel list indicating channels being used for frequency hopping, a SIB 1, or a SIB 2.

Example 22 includes the subject matter of any one of Examples 18-21, including or omitting any elements/features as optional, wherein the operations further comprise: reducing a dwell time on the anchor channel by generating PDCCH only on the anchor channel for the downlink communication.

Example 23 is an apparatus configured to be employed in a user equipment (UE) comprising: one or more processors configured to: process a paging message and a system information message based on one or more frequency hopping operations with different channels; generate an unlicensed internet of things (U-IoT) communication by generating a carrier aggregation of the different channels comprising unlicensed component carriers unanchored to any LTE component carrier in a standalone configuration based on the paging message and the system information message; and a radio frequency (RF) interface configured to provide, with RF circuitry, data for transmitting the U-IoT communication via the frequency hopping operations.

Example 24 includes the subject matter of Example 23, wherein the one or more processors are further configured to: process the paging message and the system information message in a downlink communication associated with a 2.4 GHz band of the anchor segment for an enhanced Machine-Type Communication (eMTC) in a MulteFire (MF) protocol as the U-IoT communication, wherein the paging and system information comprise a system information block (SIB) of MulteFire (MF) (SIB-MF) on a MulteFire Physical Downlink Control Channel (MPDCCH) on a different occasion for a time/frequency resource than a MPDCCH for paging information, or on a Physical Downlink Shared Channel (PDSCH); wherein the SIB-MF comprises at least one of: a channel list indicating channels being used for frequency hopping, a SIB 1, or a SIB 2.

Example 25 includes the subject matter of Example 24, including or omitting any elements/features as optional, wherein the one or more processors are further configured to: monitor only the anchor channel for the paging information carried on the MPDCCH from a broadcast communication; and update one of: a channel list for a non-Listen Before Talk (LBT) frequency hopping operation or a non-skip hopping channel list in an LBT frequency hopping operation Example 26 can include an apparatus comprising means to perform one or more elements of a method described in or related to any of examples 1-25, or any other method or process described herein.

Example 27 can include one or more non-transitory computer-readable media comprising instructions to cause an electronic device, upon execution of the instructions by one or more processors of the electronic device, to perform one or more elements of a method described in or related to any of examples 1-25, or any other method or process described herein.

Example 28 can include an apparatus comprising logic, modules, or circuitry to perform one or more elements of a method described in or related to any of examples 1-25, or any other method or process described herein.

Example 29 can include a method, technique, or process as described in or related to any of examples 1-25, or portions or parts thereof.

Example 30 can include an apparatus comprising: one or more processors and one or more computer readable media comprising instructions that, when executed by the one or more processors, cause the one or more processors to perform the method, techniques, or process as described in or related to any of examples 1-25, or portions thereof.

Example 31 can include a method of communicating in a wireless network as shown and described herein.

Example 32 can include a system for providing wireless communication as shown and described herein.

Example 33 can include a device for providing wireless communication as shown and described herein.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. An apparatus configured to be employed in a next generation or new radio NodeB (gNB) device comprising:
   one or more processors configured to:
      generate a downlink communication comprising a paging message and a system information message to enable an unlicensed internet of things (U-IoT) communication via one or more frequency hopping operations between different channels comprising an anchor segment of a long term evolution (LTE) licensed band and a data segment of a data channel, wherein the downlink communication is generated with a system information block (SIB) of MulteFire (MF) (SIB-MF) on a MulteFire Physical Downlink Control Channel (MPDCCH) on the anchor segment and a Physical Downlink Shared Channel (PDSCH) on the data channel via the one or more frequency hopping operations for MF communication at a user equipment (UE);
      generate the one or more frequency hopping operations by generating essential system information on the anchor segment and other system information on the data segment, wherein a system information block Type A (SIB-A) of the SIB-MF comprises a paging indication configured to that indicate whether a paging transmission is performed in a subsequent data channel;
      generate essential system information on the anchor segment comprising a channel list indicating which channels are being used for frequency hopping, wherein the channel list comprises a bitmap indicating the channels being used based on four groups of fourteen channels; and
      provide the downlink communication to enable the U-IoT communication;
   a radio frequency (RF) interface, configured to provide, to RF circuitry, data for a transmission related to the downlink communication.

2. The apparatus of claim 1, wherein the system information message comprises at least one of: the essential system information comprising the SIB-MF to complete a Random Access Channel (RACH) procedure or a Radio Resource Control (RRC) connection, a SIB1, a flag for the paging indication and a channel list of frequency hopping channels for the frequency hopping, wherein the paging message and the system information message are based on a 2.4 GHz band of the anchor segment for an enhanced Machine-Type Communication (eMTC).

3. The apparatus of claim 2, wherein the data channel comprises uplink and downlink transmission information on a different frequency than the anchor segment to enable the eMTC, and wherein the channel list of frequency hopping channels comprises a bitmap indicating channels or groups of channels being used for the frequency hopping operations between the different channels.

4. The apparatus of claim 1, wherein the one or more processors are further configured to:
   generate the frequency hopping operations between the anchor segment as an anchor channel and the data segment of the data channel based on a 5 millisecond (ms) dwell time for the anchor channel and a 75 ms dwell time on the data channel.

5. The apparatus of claim 1, wherein the one or more processors are further configured to generate an indication of a subframe offset between a MPDCCH and the PDSCH on the data segment on the data channel via Downlink Control Information (DCI).

6. The apparatus of claim 1, wherein the one or more processors are further configured to:
   generate the anchor segment comprising a primary synchronization signal (PSS), a secondary synchronization signal (SSS), a physical broadcast channel (PBCH), and the MPDCCH with the essential system information.

7. The apparatus of claim 1, wherein the one or more processors are further configured to generate the anchor segment on an anchor channel comprising a PSS, a secondary synchronization signal (SSS), and a PBCH, and configured to generate the PDSCH on the data channel, and wherein the anchor segment further comprises the MPDCCH for the SIB-A.

8. The apparatus of claim 7, wherein the one or more processors are further configured to generate at least one of: the MPDCCH with the SIB-MF over multiple contiguous subframes.

9. The apparatus of claim 1, wherein the one or more processors are further configured to:
   configure a channel index for the SIB-MF of the MPDCCH via a Master Information Block (MIB) of a PBCH.

10. The apparatus of claim 1, wherein the one or more processors are further configured to:
    generate a SIB-A via the MPDCCH on an anchor channel as the anchor segment, wherein the SIB-A comprises the paging indication that indicates whether paging information is carried on the subsequent data channel.

11. The apparatus of claim 1, wherein the one or more processors are further configured to:
    generate paging information of a physical downlink control channel (PDCCH) on the anchor segment as an anchor channel, and paging information of the PDSCH on the data segment as a non-anchor channel.

12. The apparatus of claim 11, wherein the one or more processors are further configured to:
    indicate a channel index of the paging information of the PDSCH via a DCI.

13. The apparatus of claim 11, wherein the one or more processors are further configured to:

indicate a subframe offset between the PDCCH and the PDSCH via a DCI, wherein a period of the anchor channel comprises a subset of a discontinuous reception period.

14. The apparatus of claim 1, wherein the one or more processors are further configured to:

generate an indication via at least one of a MIB or a SIB in a PBCH of a channel for paging transmission comprising a PDCCH and the PDSCH, or the PDCCH.

15. A non-transitory computer-readable storage medium storing executable instructions that, in response to execution, cause one or more processors of a next generation or new radio NodeB (gNB) device to perform operations, comprising:

generating a downlink communication comprising a paging message and a system information message to enable an unlicensed internet of things (U-IoT) communication via one or more frequency hopping operations between different channels, the downlink communication comprising anchor segments of an anchor channel and data segments of a plurality of data channels, wherein the downlink communication is generated with a system information block (SIB) of MulteFire (MF) (SIB-MF) on a MulteFire Physical Downlink Control Channel (MPDCCH) on an anchor segment and a Physical Downlink Shared Channel (PDSCH) on the data channel via the one or more frequency hopping operations for MF communication at a user equipment (UE);

generating the one or more frequency hopping operations by generating essential system information on the anchor segment and other system information on the data segment, wherein a system information block Type A (SIB-A) of the SIB-MF comprises a paging indication configured to indicate whether a paging transmission is performed in a subsequent data channel;

generating essential system information on the anchor segment comprises a channel list indicating which channels are being used for the one or more frequency hopping operations, wherein the channel list comprises a bitmap indicating the channels being used based on four groups of fourteen channels; and providing the downlink communication to enable the U-IoT communication based on the frequency hopping operations.

16. The non-transitory computer-readable storage medium of claim 15, wherein the downlink communication comprises the data segments as a plurality of different non-anchor channels at different 80 ms windows with the anchor segment, respectively, wherein the data segments comprise different frequencies from one another, wherein the anchor channel comprises a different frequency than the plurality of data channels.

17. The non-transitory computer-readable storage medium of claim 15, wherein the operations further comprise:

generating the MPDCCH for an essential system information block on a different occasion than another MPDCCH for paging.

18. The non-transitory computer-readable storage medium of claim 15, wherein the operations further comprise:

generating the system information message by generating the essential system information on the anchor channel and the other system information on a data segment of the plurality of data channels via the one or more frequency hopping operations, wherein the essential system information comprises at least one of: a SIB-MF on the MPDCCH, or the SIB-MF on the PDSCH; wherein the SIB-MF comprises at least one of: a channel list indicating channels being used for frequency hopping, a SIB 1, or a SIB 2.

19. The non-transitory computer-readable storage medium of claim 15, wherein the operations further comprise:

reducing a dwell time on the anchor channel by generating PDCCH only on the anchor channel for the downlink communication.

20. A baseband processor comprising:

one or more processors, coupled to at least one memory, configured to:

generate a downlink communication comprising a paging message and a system information message to enable an unlicensed internet of things (U-IoT) communication via one or more frequency hopping operations between different channels comprising an anchor segment of a long term evolution (LTE) licensed band and a data segment of a data channel, wherein the downlink communication is generated with a system information block (SIB) of MulteFire (MF) (SIB-MF) on a MulteFire Physical Downlink Control Channel (MPDCCH) on the anchor segment and a Physical Downlink Shared Channel (PDSCH) on the data channel via the one or more frequency hopping operations for MF communication at a user equipment (UE);

generate the one or more frequency hopping operations by generating essential system information on the anchor segment and other system information on the data segment, wherein a system information block Type A (SIB-A) of the SIB-MF comprises a paging indication configured to indicate whether a paging transmission is performed in a subsequent data channel;

generating essential system information on the anchor segment comprises a channel list indicating which channels are being used for the one or more frequency hopping operations, wherein the channel list comprises a bitmap indicating the channels being used based on four groups of fourteen channels; and provide the downlink communication to enable the U-IoT communication;

a radio frequency (RF) interface, configured to provide, to RF circuitry, data for a transmission related to the downlink communication.

21. The baseband processor of claim 20, wherein the system information message comprises at least one of: the essential system information comprising the SIB-MF to complete a Random Access Channel (RACH) procedure or a Radio Resource Control (RRC) connection, a SIB1, a flag for the paging indication and a channel list of frequency hopping channels for frequency hopping, wherein the paging message and the system information message are based on a 2.4 GHz band of the anchor segment for an enhanced Machine-Type Communication (eMTC).

* * * * *